July 10, 1956 W. C. THIELORN 2,754,410
CLEARANCE LIGHT FOR MOTOR VEHICLES
Filed March 26, 1954
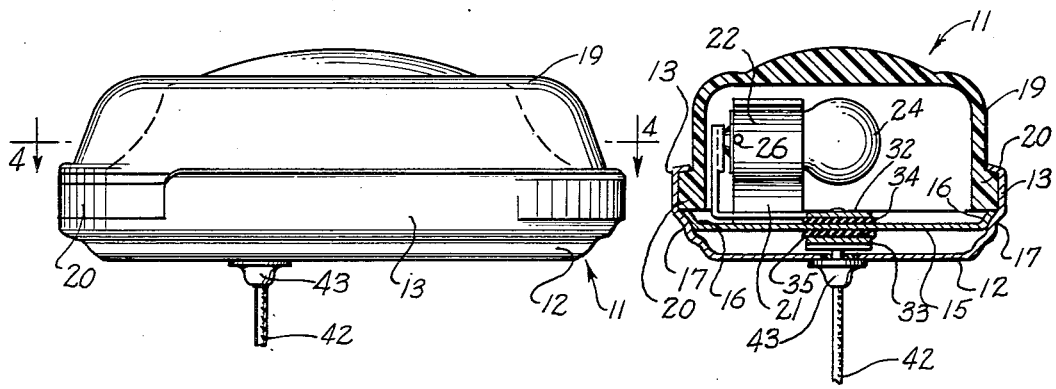
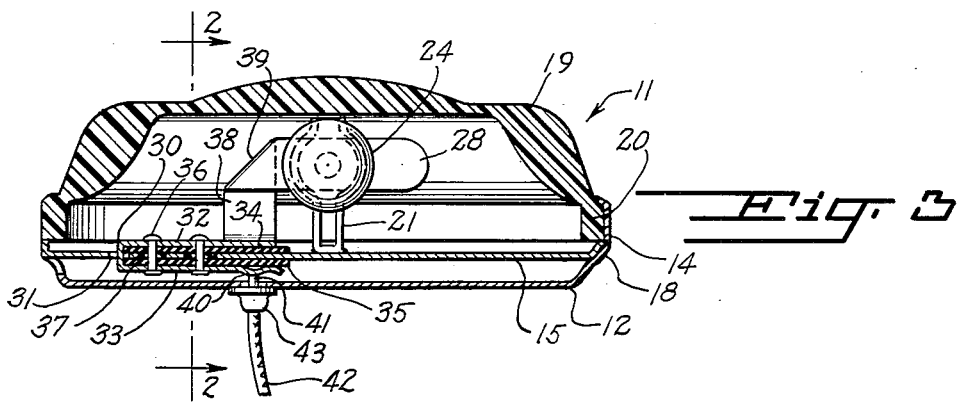
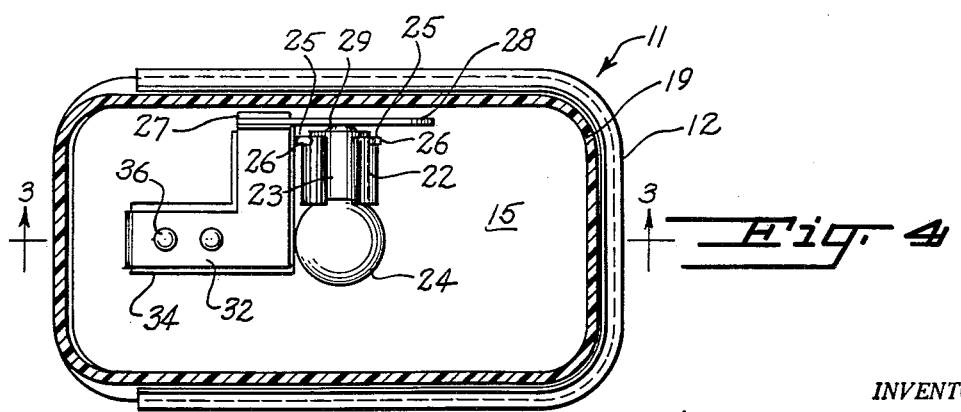
INVENTOR.
Walter C. Thielorn
BY
McMorrow, Berman + Davidson
ATTORNEYS

United States Patent Office 2,754,410
Patented July 10, 1956

2,754,410

CLEARANCE LIGHT FOR MOTOR VEHICLES

Walter C. Thielorn, Chicago, Ill.

Application March 26, 1954, Serial No. 418,880

1 Claim. (Cl. 240—7.1)

This invention relates to lighting units, and more particularly to a clearance lamp unit adapted to be mounted on a motor vehicle, such as a truck or trailer.

A main object of the invention is to provide a novel and improved clearance light which is simple in construction, which is easy to install, which is compact in size, and which has a high degree of visibility under adverse operating conditions.

A further object of the invention is to provide an improved clearance lighting unit for use on trucks, trailers, and similar vehicles, said unit being inexpensive to manufacture, being rugged in construction, and having readily replaceable components which may be easily and rapidly replaced when damaged.

Further objects and advantages of the invention will become apparent from the following description and claim, and from the accompanying drawings, wherein:

Figure 1 is a side elevational view of an improved clearance light unit constructed in accordance with the present invention.

Figure 2 is a vertical cross sectional view taken through the unit shown in Figure 1, said view being taken on the line 2—2 of Figure 3.

Figure 3 is a longitudinal cross sectional view taken through the clearance light unit of Figure 1, said view being taken on the line 3—3 of Figure 4.

Figure 4 is a horizontal cross sectional view taken on the line 4—4 of Figure 1.

Referring to the drawings, the improved clearance light unit is designated generally at 11 and comprises a generally rectangular base member 12 which may be of any suitable material, such as sheet metal, plastic or the like, said base member having the upstanding, inwardly facing channeled side walls 13, 13 on its side margins and having the upstanding channeled, inwardly facing end wall 14 on one end margin, said end wall merging with the side walls 13, 13.

In the preferred form of the invention, the base member 12 is of suitable, corrosion resistant metal, such as brass, stainless steel, or the like, which is secured to the frame of the vehicle so that it is electrically grounded.

Designated at 15 is a generally rectangular sub-base in the form of a metal pan having the continuous marginal flange 16 which is curved to conform with the curvature 17 of the side margins and transverse rear marginal portion 18 of the base 12 so as to interfit therewith.

Designated at 19 is a generally rectangular lens, similar in plan to the sub-base 15 and having marginal ribs or flanges 20 engageable on the marginal portions of the sub-base 15 and receivable therewith in the respective channeled walls of the base 12, as is clearly shown in Figures 2 and 3. From Figures 1 and 4 it will be apparent that the sub-base 15 and the lens 19 may be removed as a unit by sliding these members longitudinally to disengage same from the side flanges 13 of the base member 12. As is shown in Figure 1, one end of the base 12 is open to allow the lens 19 to be first disengaged from the side flanges 13 of the base, after which the sub-base 15 may be lifted and moved longitudinally out of the base 12.

Designated at 21 is a spring clip which is generally U-shaped in configuration and which has its bight portion conductively secured to the sub-base 15 adjacent one side margin of said sub-base and substantially at its middle portion. The spring clip 21 is formed with the opposing outwardly bowed arm portions 22, 22 which are arcuately curved to receive the shell 23 of a lamp 24. The arcuate bowed portions 22 are formed with notches 25 to interlock with the outwardly directed locking pins 26 on the lamp shell, as shown in Figures 2 and 4. Designated at 27 is a resilient contact clip having the longitudinally extending, vertical spring arm 28 which engages the center contact 29 of the lamp 24 and which exerts spring pressure on the base of the lamp acting to maintain the pins 26, 26 in locking engagement in the slots 25, 25.

The spring member 27 is provided with the U-shaped base portion 30 whose bight portion is received through a slot 31 formed in the sub-base 15 and which has the respective top and bottom arms 32 and 33. As shown in Figure 3, the arms 32 and 33 are substantially parallel, and are insulated from the sub-base 15 by respective insulating plates 34 and 35 of fiber or other suitable insulating sheet material. The arms 32 and 33 are secured to the sub-base by a pair of rivets 36 extending through the arms 32 and 33, through the insulating plates 34 and 35, and through the sub-base 15, suitable insulating bushings 37 being provided around the rivets, as shown in Figure 3.

The top arm 32 is formed with the upstanding portion 38 which is folded at 39 to define the longitudinally extending spring contact elements 28 above mentioned.

The lower arm 33 is formed adjacent its free end portion with the corrugated contact element 40 which conductively engages the upstanding terminal end 41 of the connecting wire 42, the end of the connecting wire 42 being secured by a suitable grommet 43 to the base 12 and the wire terminal 41 projecting upwardly and being insulated from said base, as shown in Figure 3.

In use, the base 12 is secured on a desired portion of the vehicle body, such as adjacent the top rear corners or top front corners of the vehicle, the base being electrically grounded to the body of the vehicle, as above described. The energizing wire 42 is connected in any suitable manner to the ungrounded terminal of the vehicle battery, as through a suitable control switch. As is clearly apparent from Figure 3, when the corrugated contact element 40 of the contact member 30 engages the wire terminal 41, the contact element 28 is electrically connected to the ungrounded terminal of the vehicle body, whereby the lamp 24 will be energized, assuming the control switch to be in a closed position. Since the shell 23 of the lamp is grounded, the lamp will become energized.

When the lens 19 or the lamp 24, or any of the other elements engaged on the base 12 becomes damaged, said elements may be readily replaced, since the damaged portions may be removed by disengaging the lens 19 and the sub-base 15 from the base 12 in the manner above described, namely, by first sliding the lens 19 longitudinally out of engagement with the channeled side walls 13, 13 and then lifting the sub-base 15 slightly and sliding said sub-base out of said channeled side walls. Since the sub-base 15 may be thus easily removed from the unit, replacement of the lamp 24 is greatly facilitated. Similarly, if the sub-base 15 is totally damaged, a new sub-base may be installed rapidly and with a small amount of effort.

While a specific embodiment of an improved clearance light for motor vehicles has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A clearance light for motor vehicles comprising a generally rectangular base member, upstanding inwardly facing channeled side walls on the side margins of said base member, an upstanding channeled inwardly facing end wall on one end margin of said base member merging with said channeled side walls, a generally rectangular sub-base having side marginal portions slidably engageable in said channeled side walls, a lamp socket mounted on said sub-base, a corrugated contact terminal on the under side of said sub-base electrically connected to said socket, a second contact terminal on said base member engageable by said corrugated terminal when the sub-base is moved along said side walls to a position wherein its end marginal portion is received in and substantially abuts said channeled end wall, a generally rectangular, downwardly concave transparent lens member similar in plan to said sub-base, and side flanges on said lens member slidably engageable in said channeled side walls in overlying relationship to the side and end marginal portions of said sub-base, said socket comprising a generally U-shaped spring clip secured in said sub-base and adapted to clampingly engage the shell of a lamp, and a resilient contact arm secured to said sub-base and adapted to engage the center contact of the lamp, said corrugated contact terminal being electrically connected to said contact arm.

References Cited in the file of this patent

UNITED STATES PATENTS

| | | |
|---|---|---|
| 2,329,162 | Perkins | Sept. 7, 1943 |
| 2,688,688 | Holtz | Sept. 7, 1954 |